(No Model.)

W. MELVIN.
BICYCLE LOCK.

No. 589,440. Patented Sept. 7, 1897.

Witnesses:
H. B. Hallock.
S. J. Williamson

Inventor:
William Melvin.
by Geo. H. Holgate
Attorney.

United States Patent Office.

WILLIAM MELVIN, OF PHILADELPHIA, PENNSYLVANIA.

BICYCLE-LOCK.

SPECIFICATION forming part of Letters Patent No. 589,440, dated September 7, 1897.

Application filed October 22, 1896. Serial No. 609,740. (No model.)

*To all whom it may concern:*

Be it known that I, WILLIAM MELVIN, a citizen of the United States, residing at Philadelphia, in the county of Philadelphia and State of Pennsylvania, have invented a certain new and useful Improvement in Bicycle-Locks, of which the following is a specification.

My invention relates to a new and useful improvement in bicycle-locks, and has for its object to provide a simple, cheap, and effective device of this description which may be permanently attached to the top brace of a bicycle in conjunction with the head thereof in such manner as to lock the steering-fork shank against rotation and in a position in which the machine cannot be ridden.

A further object of my invention is to provide convenient means for unlocking and retaining the bolt in its retracted position when not needed for use and permit its being swung into place without the use of a key when locking the steering-fork.

With these end in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings forming a part of this specification, in which—

Figure 1:
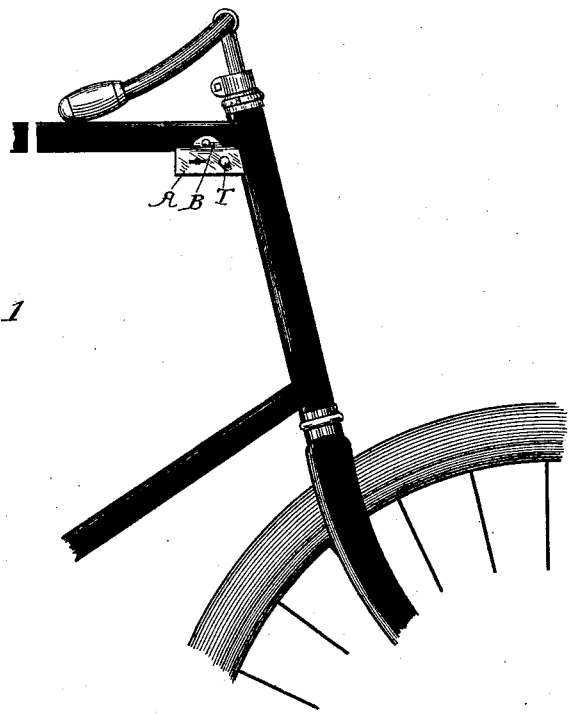
Figure 3:
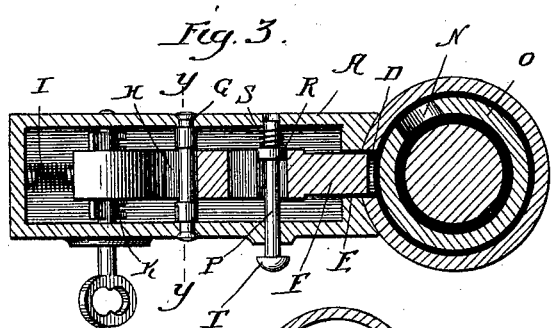
Figure 2:
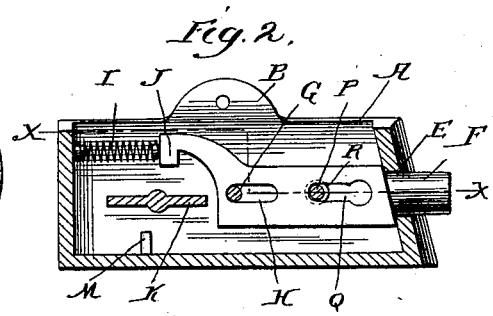
Figure 4:
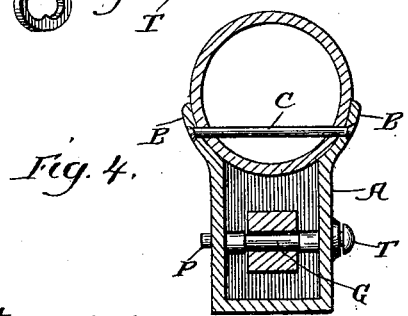

Figure 1 is an elevation of a portion of a bicycle, illustrating the application of my improvement thereto; Fig. 2, a vertical longitudinal section of the lock; Fig. 3, a section at the line $x\ x$ of Fig. 2; Fig. 4, a section at the line $y\ y$ of Fig. 3, and Fig. 5 a view of the key for retracting the bolt.

In carrying out my invention as here embodied I provide a casing or shell A of a suitable size and design, and this casing has formed upon its upper edges the ears B, which are so shaped as to partly embrace the upper brace of the bicycle and is secured to the same by the rivets C. The front end of the casing is concaved, so as to fit the contour of the steering-head, as clearly shown in Fig. 3, and through this head is formed a hole D, which registers with the hole E, the latter being formed in the front end of the casing and serving as a guide for the nose of the bolt F. The bolt F is also guided within the casing by the rivet-pin G, passing through the slot H in the bolt, and the bolt is also given a forward tendency by the spring I, interposed between its rear end and the rear end of the casing.

Figure 5:
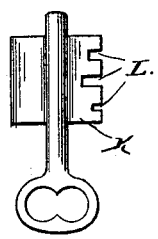

A lug J projects downward from the rear end of the bolt and is for the purpose of permitting the key K to retract the bolt when turned, as will be readily understood, and in practice the key is of the shape shown in Fig. 5, having two tangs upon the shanks thereof extending in opposite directions, one of which is adapted to operate upon the lug in the retraction of the bolt, while the other is provided with wards L, which must register with the guards M in order that the key may be revolved.

A hole N is formed in the steering-fork shank O, and when this hole is brought into alinement with the hole D and a bolt left free to move it will be forced by this spring into the hole N, thereby locking the steering-fork against rotation, and in practice the hole N is so placed relative to the location of the wheel in the fork as to throw said wheel at an angle sufficient to prevent the riding of the machine when so placed. Thus it is obvious that the bicycle will be rendered safe by simply permitting the bolt to shoot within the hole N; and another advantage of this arrangement is that the bicycle may be more readily stationed against an object, such as a post or wall, since the steering-wheel cannot change its position, which would cause the machine to lose its equilibrium.

When the bolt has been retracted by the use of the key, it is obvious that it must be held in its position in order that it may not shoot again within the hole N or bear upon the steering-fork shank when the machine is in use, and this I accomplish by providing a pin P, arranged to slide crosswise of the casing and passed through a buttonhole-slot Q, and upon this pin is secured a button R of a size adapted to fit the enlargement of the buttonhole-slot. A spring S is interposed between the button and the side of the casing, so as to give said button a tendency to move inward, and a knob T is formed upon the outer end of the pin in order that the latter may be forced inward against the action of its spring.

From this description it is obvious that when the bolt has been retracted by the key sufficiently to bring the enlargement of the buttonhole-slot into alinement with the button R the latter will spring into said enlargement, thereby holding the bolt in its retracted position; but when it is again desired to permit the bolt to engage with the hole N it is only necessary to press the knob T with sufficient force to disengage the button from the buttonhole-slot, when said bolt will be free to move inward and be so moved by the spring I. This arrangement will prevent the necessity of using the key to lock the machine, and the only use to which it is necessary to put the key is a retraction of the bolt. Thus a person without effort may either lock or unlock the bicycle and will not be encumbered with the storing of the lock, since the latter for all practical purposes remains a part of the machine.

A lock made in accordance with my improvement is exceedingly cheap, simple, and effective and when once applied to a machine will accomplish the purpose for which it is intended and last indefinitely, as little or no wear takes place thereon.

Having thus fully described my invention, what I claim as new and useful is—

In a lock, a casing, ears formed with said casing for securement to the top brace of a bicycle, a bolt fitted to slide within said casing, a spring for actuating said bolt in one direction, a lug formed with the bolt to receive the key, guards to regulate the operation of the key, a spring-actuated pin passed through the casing and a buttonhole-slot in the bolt, a button secured upon the pin, and a knob formed upon said pin, all arranged substantially as and for the purpose set forth.

In testimony whereof I have hereunto affixed my signature in the presence of two subscribing witnesses.

WILLIAM MELVIN.

Witnesses:
S. S. WILLIAMSON,
MARK BUFORD.